May 24, 1932.　　　J. H. ROBERTS　　　1,860,297
NUT LOCK
Filed April 3, 1930
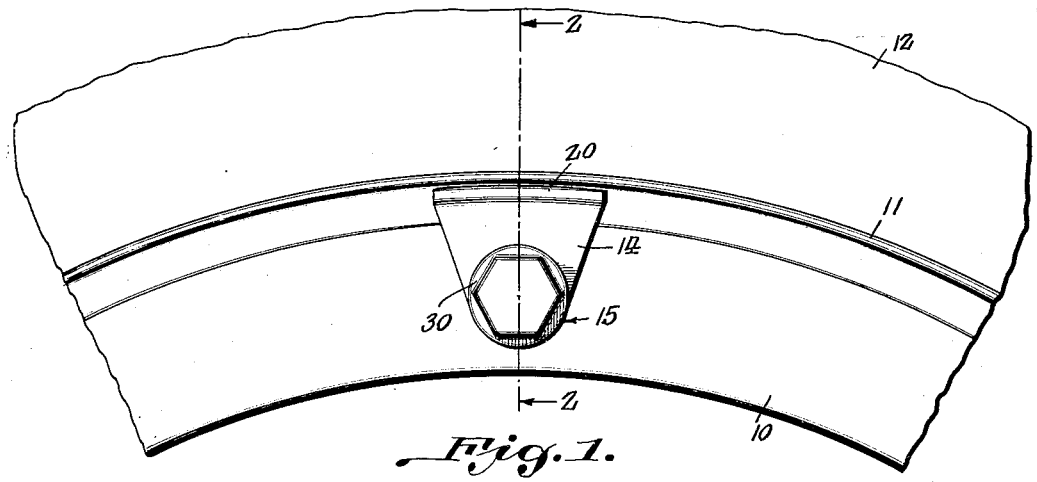
Fig.1.
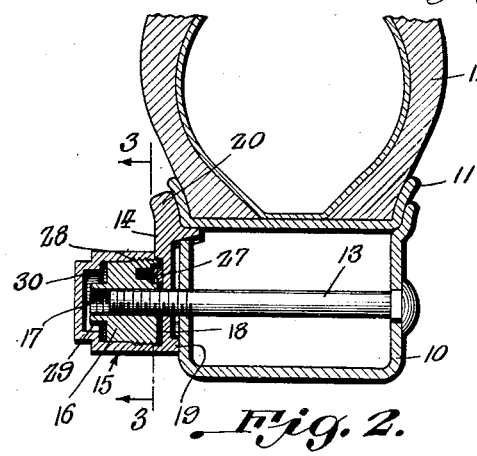
Fig.2.
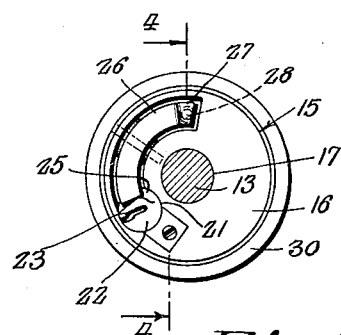
Fig.3.
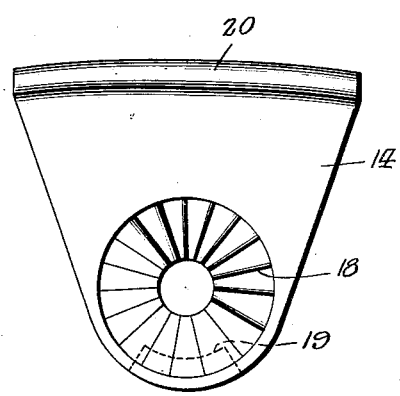
Fig.5.
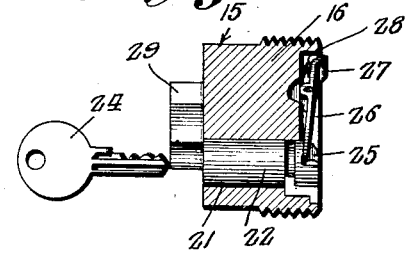
Fig.4.
J. H. Roberts, Inventor
By
Attorney Patented May 24, 1932

1,860,297

UNITED STATES PATENT OFFICE

JAMES H. ROBERTS, OF BLYTHEVILLE, ARKANSAS

NUT LOCK

Application filed April 3, 1930. Serial No. 441,402.

This invention relates to new and useful improvements in nut locks.

One object of the invention is to provide a nut lock which may be effectively used to prevent removal of the demountable rim of an automobile wheel, by an unauthorized person.

Another object is to provide a device of this character which includes means for maintaining the nut of a lug bolt, on an automobile wheel, against being rotated in an attempt to remove the rim, and novel lock means, operable by a key, whereby to permit the authorized application and removal thereof.

Other objects and advantages will be apparent from the following description when taken in connection with the accompanying drawings.

In the drawings:

Figure 1 is an elevation of the device applied to an automobile rim.

Figure 2 is a vertical sectional view on the line 2—2 of Figure 1.

Figure 3 is a vertical sectional view on the line 3—3 of Figure 2.

Figure 4 is an enlarged vertical sectional view of the member 16, together with the pawl 26, carried thereby.

Figure 5 is an enlarged elevation of the lug which contains the ratchet teeth.

Referring to the accompanying drawings, 10 represents a portion of the felly of an automobile wheel, on which is mounted the demountable rim 11, carrying the tire 12. Disposed transversely through the felly is a bolt 13, on which is disposed the rim holding lug plate 14, the threaded end of said bolt projecting beyond the lug plate to receive thereon the nut represented as a whole by the numeral 15. The nut 15 comprises an externally threaded body 16, through which is formed a threaded bore 17, arranged to be threaded on the end of the bolt 13, against the said lug plate 14. The lug plate is formed with a circular series of ratchet teeth 18, in its outer face, and a segmental flange 19, the latter of which bears against the side face of the felly 10, while a lip 20, on the upper portion of the lug plate engages in retaining relation with the rim 11, said lip also serving to prevent rotation of the lug when the nut is turned. Formed longitudinally through the nut, adjacent one side thereof, is a bore 21, and rotatably disposed in said bore is the barrel 22 of a lock, said barrel having a longitudinal opening 23, to receive the key 24. A portion of the inner end face of the barrel is formed with a circularly extending inclined shoulder 25, and centrally pivoted, as clearly seen in Figures 3 and 4, within an arcuate cavity in the inner end of the nut is a curved pawl member 26. One end of the pawl member lies against the said shoulder, while the other end is formed with a projection 27 adapted to engage with the ratchet teeth 18 of the lug plate 14, whereby to permit turning of the nut in a direction to clamp the lug plate tightly against the side of the felly and rim, but to effectively prevent rotation of the nut in the opposite direction. Disposed within the said cavity is a spring 28, one end of which bears against the bottom of the cavity while the other end bears against the adjacent, or projection-carrying end of the pawl member, whereby to normally urge this latter end of the pawl member outwardly for engagement with the teeth of the lug plate. The nut is preferably circular, and on the outer end face thereof there is formed an extension 29 for engagement by a wrench, for the purpose of applying and removing the nut. A cap 30 is screwed on the outer portion of the nut for the purpose of excluding dirt, snow, water, and the like from the lock barrel, which would prevent easy removal of the nut when desired.

In the operation of the device, the operator first places the rim on the felly and then applies the nuts to the different lug bolts of the felly, together with the appropriate lug plates. The special lug plate 14 is applied to the bolt which is diametrically opposite to the point through which the valve stem of the tire passes, and then the nut 15 screwed on this particular bolt, so that the projection of the pawl member passes over the teeth of the lug plate. After the nut has been turned up to the desired tightness, the operator applies the cap 30. The rim is thus securely locked on the felly, and the locking mechanism protected from moisture and foreign matter. When it is desired to remove the tire the operator removes the cap 30, places the key in the lock barrel and rotates the latter, to cause the shoulder 25 to rock the pawl member, whereby to disengage its projection from the teeth of the lug plate, in the event that it is desired to remove the nut. Removal of the nut can then only be accomplished by removing the cap 30, inserting the key 24 in the outer end of the barrel 22, and rotating the latter until the shoulder 25 rocks the pawl member 26 out of engagement with the ratchet teeth of the lug plate 14.

What is claimed is:

1. In a nut locking device, the combination with a bolt and a ratchet toothed disk thereon, of a nut engaged on the bolt having a rockable pawl for engagement with said teeth, means normally urging the pawl into engagement with the teeth, and a cam member carried by the nut for rocking the pawl out of engagement with the teeth.

2. In a nut locking device, the combination with a bolt and a ratchet toothed disk thereon, of a nut engaged on the bolt, one end of the nut bearing on the said disk and having a cavity therein, a rockable pawl pivotally supported in said cavity and having one end formed for engaging said teeth of the disk, the nut also having a longitudinal bore, a rotatable member mounted in said bore and having a circularly extending inclined shoulder for engaging the other end of the pawl whereby to rock the pawl out of engagement with the teeth, and spring means for urging the pawl into engagement with said teeth.

3. A locking device comprising a stationary member having an opening and ratchet teeth surrounding said opening, a threaded stem projecting through said opening, a nut engaged on the stem, a centrally pivoted yieldably urged pawl carried by said nut having one end engaged with said ratchet teeth, and a rotary cam member engaged with the other end of said pawl operable to rock said pawl out of engagement with said teeth.

In testimony whereof, I affix my signature.

JAMES H. ROBERTS.